March 24, 1931.  J. LUNDGREN  1,797,269
MOTOR DRIVEN BALANCING MACHINE
Filed Nov. 20, 1926  3 Sheets-Sheet 1

Inventor
Jacob Lundgren
BY
Herbert S. Fairbanks
Attorney

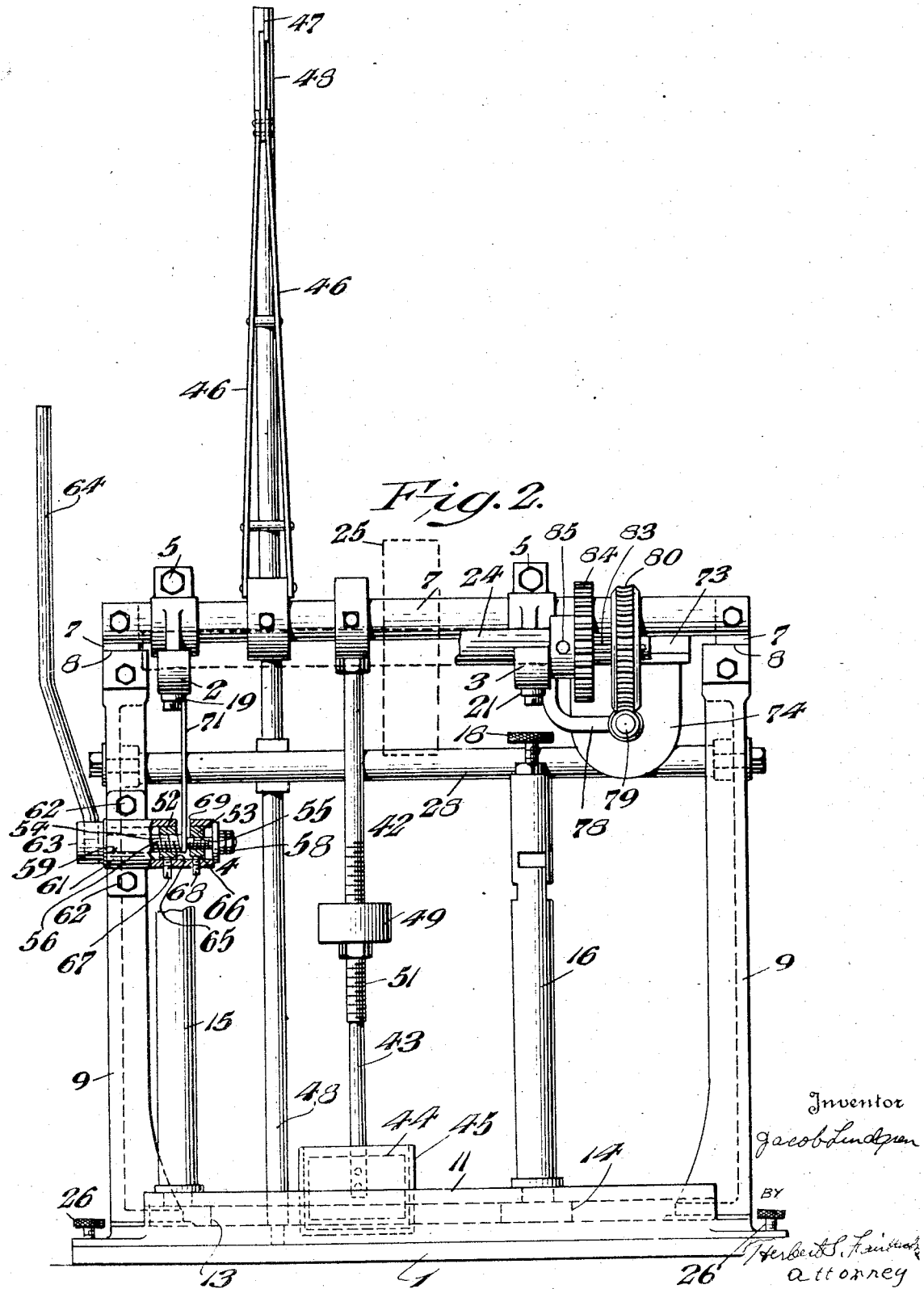

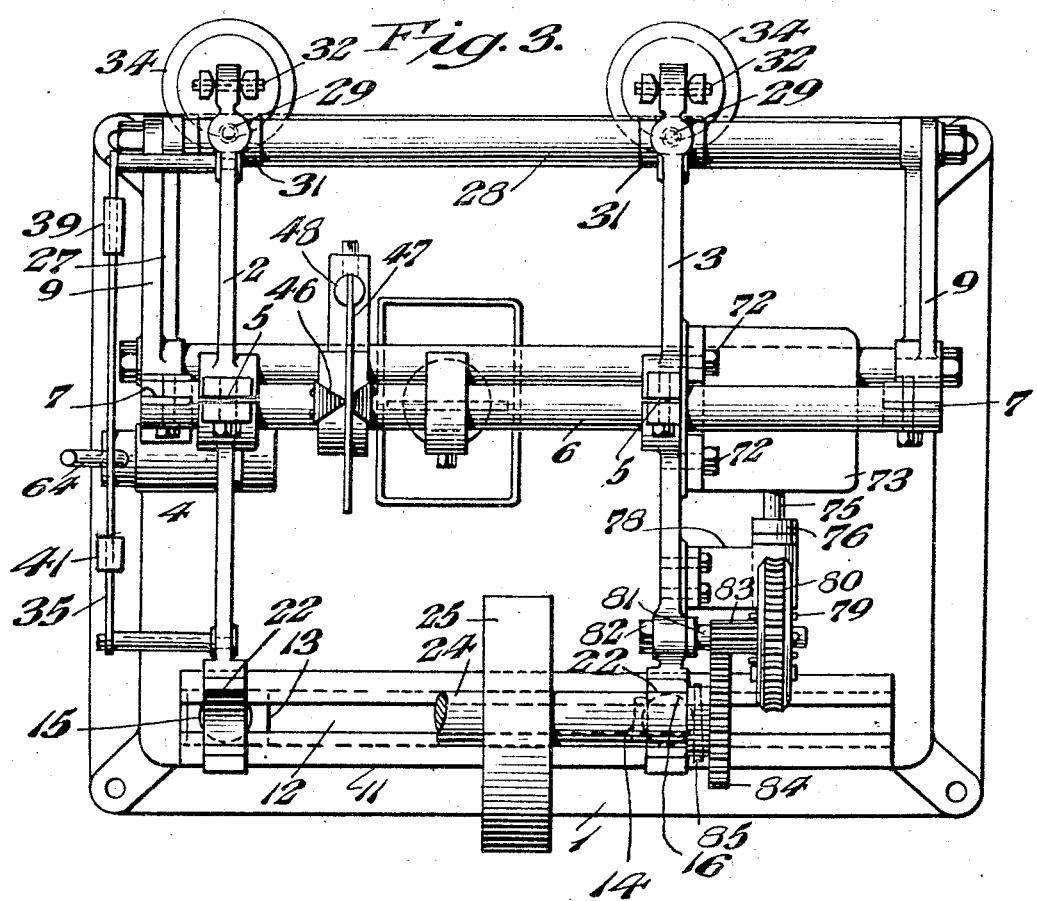

Patented Mar. 24, 1931

1,797,269

UNITED STATES PATENT OFFICE

JACOB LUNDGREN, OF PHILADELPHIA, PENNSYLVANIA, ASSIGNOR TO TINIUS OLSEN TESTING MACHINE CO., OF PHILADELPHIA, PENNSYLVANIA, A CORPORATION OF PENNSYLVANIA

MOTOR-DRIVEN BALANCING MACHINE

Application filed November 20, 1926. Serial No. 149,595.

The object of my invention is to devise a novel construction of a motor driven balancing machine which automatically indicates the amount of unbalance of the body under test and wherein a fulcrumed beam is employed which provides a support for the specimens under test, having a constant spaced relationship with said fulcrum and disposed in substantially the same plane.

A further object of my invention is to devise a novel construction and arrangement of a motor driven balancing machine in which a pendulum is provided with means for indicating the moments for different angular positions, and means are provided to associate the body to be tested with said pendulum in such a manner that the moments of the pendulum balance the moments of the body to be tested, means being provided for adjusting the center of gravity of the pendulum.

With the above and other objects in view as will hereinafter more clearly appear, my invention comprehends a novel construction and arrangement of a motor driven balancing machine.

It further comprehends a novel balancing machine of the character herein set forth, wherein novel means are provided for supporting and revolving the work under test.

Other novel features of construction and advantage will hereinafter more clearly appear in the detailed description and the appended claims.

For the purpose of illustrating the invention, I have shown in the accompanying statement a typical embodiment of it, which, in practice, will give reliable and satisfactory results. It is, however, to be understood that this embodiment is typical only and that the various instrumentalities of which my invention consists can be variously arranged and organized, and the invention is not, therefore, limited to the precise arrangement and organization of these instrumentalities as herein set forth.

Figure 2 is a rear elevation of the balancing machine.

Figure 3 is a top plan view of the machine.

Figure 4 is a top plan view showing more clearly the means carried by the balancing beam for effecting the rotation of the specimen under test.

Similar numerals of reference indicate corresponding parts.

Referring to the drawings:—

Figure 1:
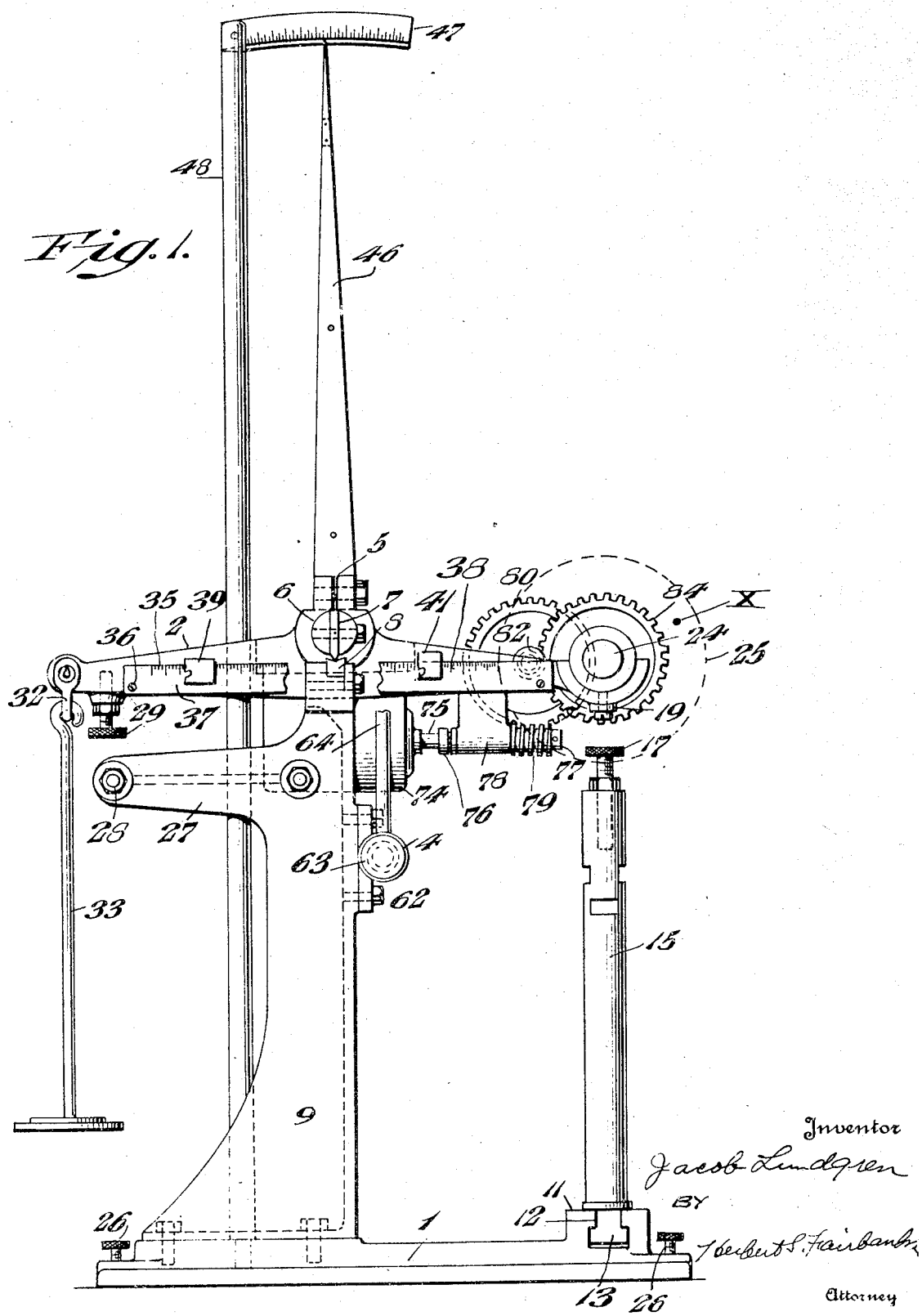
Figure 1 is a side elevation of a motor driven balancing machine embodying my invention.

1 designates the base of the machine on which are mounted a pair of balancing beams 2 and 3, respectively, which are operatively connected with a locking mechanism 4 in order to lock such beams in any desired position.

The balancing beam 2 is substantially a duplicate of the balancing beam 3 and is adjustably clamped at 5 to a shaft 6, the ends of which are provided with fulcrumed members 7 mounted in blocks 8 removably mounted on the upper ends of spaced pedestals 9 which latter are carried at opposite ends of the base 1 and adjacent to one side. The other side of the base 1 is provided with a longitudinally raised portion 11 having a slot 12 for the removable reception of sliding blocks 13 and 14 which form removable base members for vertically extending stop members 15 and 16, the upper ends of which are adapted to receive the adjustable screw members 17 and 18, respectively.

These screw members 17 and 18 are respectively positioned directly beneath shoulders 19 and 21 extending from an under side of bearings 22 and 23 which are formed on the corresponding ends of the beams 2 and 3.

The bearings 22 and 23 provide a revoluble mounting for a shaft 24 which carries the body 25 to be tested. The positioning of the base 1 may be adjusted by screws 26 mounted on the several corners thereof.

The end pedestals 9 are provided with outwardly extending arms 27 which are interconnected by a bar 28, disposed directly below the remaining ends of the beams 2 and 3. The sections of the beams 2 and 3 immediately adjacent to the bar 28 are provided with vertically adjustable screw stop-members 29 which respectively co-act with collars 31 slidably mounted on the bar 28. The collars 31 serve to prevent the marking of the bar 28 by the stop screws 29. The remaining ends of the beams 2 and 3 are respectively provided with hinge members 32 adapted to support removable weight holders 33 having one or more weights 34, whereby the specimens 25 to be tested and the shaft 24 may be substantially counterbalanced.

A scale 35 is secured by bolts 36 to the beam 2 and is provided with scale portions 37 and 38 and co-operating sliding weights 39 and 41, respectively. The scale portions 37 and 38 are positioned on opposite sides of the shaft or fulcrumed member 6. The accurate balancing of the beams 2 and 3 is further facilitated by giving to one of the sliding weights, a weight which is a multiple of that of the other sliding weight 41.

The amount of unbalance of the specimens 25 is automatically indicated by a pendulum 42 adjustably secured to the fulcrumed member 6 and, as illustrated, such pendulum comprises a downwardly extending rod 43 terminating in a plate 44 disposed within an oil filled receptacle 45 so that the movement of the pendulum 42 is suitably dampened.

A vertically extending supporting pointer 46 is adjustably secured to the fulcrumed member 6 and is adapted to move over a graduated scale 47 mounted on the rod 48 rigidly supported on the base 1.

The scale 47 is so graduated that the pointer 46 indicates directly the moments of the pendulum 42 as it is displaced from its vertical position illustrated in the drawings. The scale 47 may be graduated in ounce-inches. The beam scales 37 and 38 are so calibrated that the change in moment incident to a movement of either of the weights 39 or 41 is directly indicated thereon, and also directed by the movement of the pointer 36 over the graduated scale 47.

The scale 47 may be calibrated if it does not indicate accurately the change in moment resulting upon a movement of either of the weights 37 and 41. This desired result may be accomplished by mounting a weight 49 on a threaded portion 51 of the rod 43, thereby permitting a vertical adjustment of the weight 49 and a corresponding change in the center of gravity of the pendulum 42.

The locking mechanism 4 comprises a pair of cylindrical collars 52 and 53 having oppositely threaded perforations 54 and 55 for the reception of the oppositely threaded portions 56 and 57 of a shaft 58. The shaft 58 is mounted in a boring 59, of a casing 61, the latter being secured by screws 62 to the front and pedestal 9. An outer end 63 of the shaft 58 is provided with an operating handle 64. The cyindrical collars 52 and 53 are caused to move longitudinally of the boring 59, when the cooperating threaded portions 54 and 55 are turned, by providing the lower sides thereof with slots 65 and 66 adapted to receive the ends of the screw members 67 and 68 which are adjustably secured in the walls of the casing 61. An upper side of the casing 61, intermediate the longitudinally movable collars 53 and 54, is provided with a slot 69 for the reception of a plate member 71 extending downwardy from the beam 2.

It will thus be seen that the beam 2 and its adjuncts may be clamped in any desired position by actuating the handle 64 to bring the longitudinally movable collars 62 and 63 into clamping engagement with the opposite sides of the depending plate 71. The clamping mechanism is released by moving the actuating arm 64 in an opposite direction. The simultaneous clamping movement of the clamping collars 62 and 63 into and out of engagement with the movable plate 71 is necessary in order to avoid any undesirable drag on the movable apparatus.

The construction hereinbefore described is similar to that described and broadly claimed in my co-pending application on balancing apparatus, Serial No. 748,160, in which the work to be tested is manually rotated, and therefore the number of specimens tested in a given time is necessarily limited.

It is the essence of the present invention to devise, in conjunction with a balancing apparatus of the type hereinbefore described, a motor drive for the shaft which carries the work or specimens to be tested in order to reduce to a minimum the time that it is necessary to take to test a specimen.

The scale beam 3, seen in Figures 3 and 4, has secured to it by means of fastening devices 72, a motor supporting bracket 73, to the underface of which is secured, in any desired manner, a motor 74, the shaft 75 of which is secured by means of a coupling 76 to a worm shaft 77 journalled in a bearing 78 carried by the scale beam 3 and provided with a worm 79 which meshes with the worm gear 80. The worm gear 80 is provided with a hub 81 which is loosely mounted on a stud shaft 82 carried by the beam 3.

The hub 81 has fixed to it a gear 83 which meshes with the gear 84. The gear 84 has its hub fixed to the shaft 24 by means of a taper pin 85.

It will thus be seen that the motor which drives the shaft 24 is carried by and moves in unison with the scale beam 3.

Assuming now that the parts are in the position seen in Figure 1, that the clamping means are disengaged, and assuming, for purpose of description, that the center gravity of the specimen 25 under test is at X where the moment thereof is greatest, then, an angular movement of the specimen 25 through 180° brings the center of gravity X to the point where the amount thereof is least, and causes the pointer 46 to move over the scale 47 a certain number of divisions which represents the amount of unbalance of the specimen 25. Thus the machine embodying my invention indicates automatically the amount of unbalance of a specimen without the necessity of making adjustments to the beam scales.

Having once determined the positions of the specimens 25 giving the maximum and minimum moments, as indicated by the deflection of the pointer 46, the angle within which the balancing weight is to be added may be accurately determined by moving the specimen 25 from either of said positions through an angle of 90°. In this position, a slight movement of the center of gravity X from the exact mid position causes a large change in the moment arm of the body 25 and a corresponding large deflection of the pointer 46. Since the angle within which the balancing weight is to be added may be thus ascertained, and the amount of unbalance of the body 25 is already determined, the body 25 may now be balanced with a high degree of accuracy.

It will be apparent from the foregoing that in accordance with my present invention the specimen carried by the shaft 24 which is supported on the scale beam can be revolved at any desired speed by mechanism carried by one of said scale beams and operatively connected with the specimen supporting shaft so that the testing of the specimens can be very rapidly effected.

The specimen to be tested may be located at any desired point on the shaft 24.

In a balancing machine of this character, if it is actuated by hand the angle of unbalance can not be accurately determined, whereas in a motor driven balancing machine of the character herein disclosed uniform swing and a continuous reading can be obtained and the position of unbalance can be determined during an entire revolution so that very accurate reading can be obtained.

It will now be apparent that I have devised a new and useful motor driven balancing machine which embodies the features of advantage enumerated as desirable in the statement of the invention and the above description, and that while I have, in the present instance, shown and described a preferred embodiment thereof which will give reliable results, it is to be understood that this embodiment is susceptible of modification in various particulars without departing from the spirit or scope of the invention or sacrificing any of its advantages.

Having thus described my invention what I claim as new and desire to secure by Letters Patent, is:—

1. Balancing apparatus comprising a beam having a fulcrum, a specimen support rotatably carried by said beam and having a constant spaced relation to said fulcrum, a motor carried by said beam and operatively connected with said specimen support to rotate it, a pendulum connected with said beam to indicate the moments for different angular positions, and means whereby the unblance of a specimen may be automatically indicated as it is moved from one angular position to another, said means including a pointer fixed to said beam and a graduated dial with which said pointer cooperates.

2. Balancing apparatus comprising a beam having a fulcrum, a specimen support rotatably carried by said beam and having a constant spaced relation to said fulcrum, said fulcrum and specimen support being disposed in a common plane, a motor carried by said beam and operatively connected with said specimen support to rotate it, a pendulum connected with said beam to indicate the moments for different angular positions, means to vary the center of gravity of said pendulum, and means whereby the unbalance of a specimen may be automatically indicated as it is moved from one angular position to another, said means including a pointer fixed to said beam and a graduated dial with which said pointer cooperates.

3. Balancing apparatus comprising a beam having a fulcrum, a specimen support rotatably carried by said beam and having a constant spaced relation to said fulcrum, a pendulum having a point of support with said beam, said fulcrum, specimen support, and pendulum point of support being in a common plane, a motor carried by said beam and operatively connected with said specimen support to rotate it, and means whereby the unbalance of a specimen may be automatically indicated as it is moved from one angular position to another.

4. Balancing apparatus comprising a beam having a fulcrum, a shaft rotatably carried by said beam and forming a specimen support having a constant spaced relation to said fulcrum, a motor carried by said beam and operatively connected with said shaft to drive it, a pendulum connected with said beam, and means whereby the unbalance of the specimen under test may be automatically indicated as it is moved from one angular position to another, said means including a pointer fixed to said beam and a graduated dial with which said pointer cooperates.

5. Balancing apparatus comprising a support, a member mounted thereon with its center of gravity below said support, a beam secured to said member, a specimen support rotatably carried by said beam, a motor carried by said beam to rotate said specimen support, the weight of said specimen being substantially counterbalanced, and indicating means responsive to a movement of said member.

6. Balancing apparatus comprising a pendulum, a fulcrumed member movable therewith having two fulcrums, a shaft rotatably carried by said member and forming a specimen support a predetermined distance from the fulcrum and in a common plane with it, a motor carried by said member and operatively connected with said shaft to drive it, a pendulum connected with said beam to indicate the moments for different angular positions, the moments of the pendulum balancing the moments of the body to be tested, and indicating means responsive to a movement of said pendulum.

7. Balancing apparatus comprising a fulcrumed beam having two fulcrums, a pendulum connected with said beam and tending to maintain it in a predetermined position, a specimen support rotatably carried by said beam and disposed in the same plane as the fulcrum of said beam, a balancing weight for said beam, and means for indicating the amount of unbalance of the specimen under test.

8. Balancing apparatus, comprising a fulcrumed beam having two fulcrums, a specimen support rotatably mounted at one end of said beam, counterbalancing means mounted at the other of said beam, a pendulum connected with said beam, means to vary the center of gravity of said pendulum, means carried by said beam to rotate said specimen support, and means including a pointer and a co-operating scale for indicating the unbalance of said specimen.

9. Balancing apparatus, comprising a fulcrumed beam, a specimen support rotatably mounted at one end of said beam, counterbalancing means mounted at the other end of said beam, means carried by said beam to rotate said specimen support, and means including a pendulum, a pointer and a co-operating scale to indicate the unbalance of the specimen under test, said scale being calibrated to indicate the moments of said pendulum for different position.

10. In a motor driven balancing machine, a pendulum provided with means for indicating the moments for different angular positions, means including a motor driven shaft to associate the body to be tested with said pendulum in such a manner that the moments of the pendulum balance the moments of the body to be tested, and means to adjust the center of gravity of the pendulum.

JACOB LUNDGREN.